Sept. 26, 1939.   S. A. JEFFRIES   2,174,267
SEMICAB FORWARD
Filed May 20, 1938
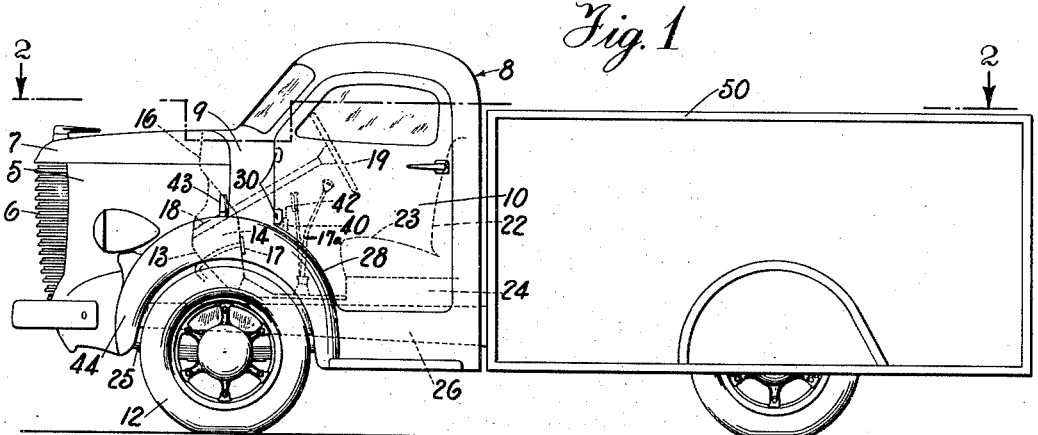
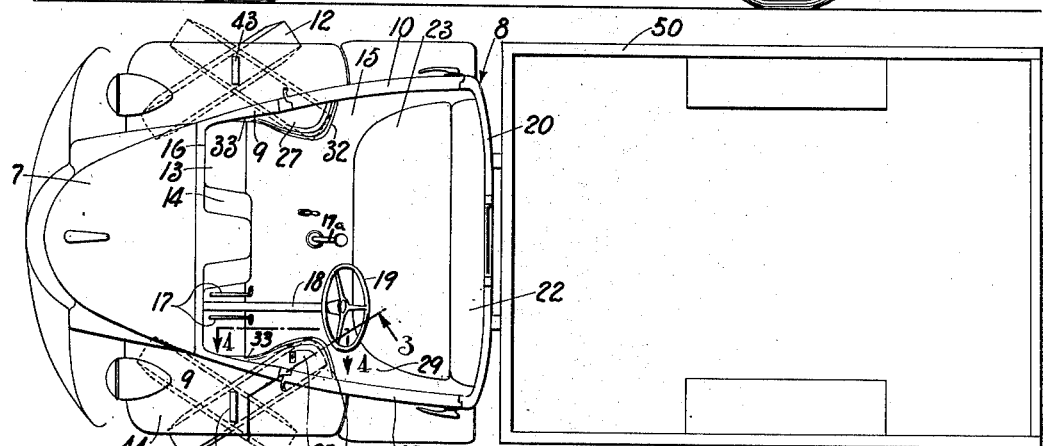
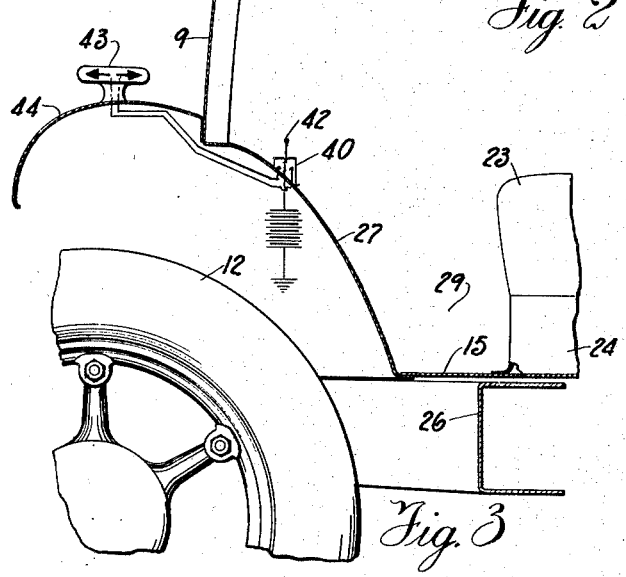
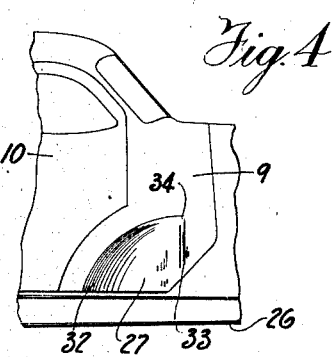
INVENTOR.
Schuyler A. Jeffries
BY Walter E. Schirmer
ATTORNEY.

Patented Sept. 26, 1939

2,174,267

UNITED STATES PATENT OFFICE 2,174,267

SEMICAB FORWARD

Schuyler A. Jeffries, South Bend, Ind., assignor to
The Studebaker Corporation, South Bend, Ind.,
a corporation of Delaware Application May 20, 1938, Serial No. 209,000

5 Claims. (Cl. 296—28)

This invention relates to trucks or other types of commercial vehicles and is more particularly concerned with the arrangement of the operator's cab in such vehicles to increase the pay load space available in the vehicle.

In the last few years a considerable number of trucks have been developed in which the operator's cab is located over the engine, these being known generally as cab-over-engine trucks. While with such trucks the space remaining for any given wheelbase of the truck in which the load may be carried is materially increased, there are a number of disadvantages in the construction which have been objected to by operators of such vehicles and also by the manufacturers. Some of these are inaccessibility of the engine and parts thereof for inspection and service, the loss of riding comfort for the operator and the necessity for development of special types of controls for the engine and transmission.

The standard type of truck heretofore produced has had the operator's cab placed rearwardly of the front axle with the result that it took up an appreciable amount of space rearwardly of the axle which could otherwise be utilized for carrying pay load if the cab were moved up over the engine.

The present invention in its broadest conception is directed to a construction in which a compromise has been effected between the standard type of truck and the cab-over-engine type. With the present construction, in a ton and a half truck of the conventional type, I have found that while the pay load space is increased approximately 30 inches over the standard type of truck, there is a loss of approximately 7 inches with respect to the pay load space available in the cab-over-engine type of truck. However, the advantages of employing a cab not mounted over the engine are sufficient to warrant the loss of this relatively small amount of additional pay load space in view of the gains made over the conventional trucks which have heretofore been manufactured.

One feature of the present invention is the placing of the engine of the truck forwardly of the front axle with the dash board and the toe board of the vehicle being disposed substantially in a vertical plane passing through the front axle. This places the operator's cab considerably forward of the position heretofore provided for it and thus increases the available space for the truck body or pay load portion of the vehicle. However, due to the fact that the front truck wheels are dirigibly mounted for steering movement some provision has to be made with the cab disposed in this manner to accommodate such steering movement. In the present construction this is accomplished without raising the cab from the chassis of the vehicle by providing wheel house portions projecting laterally into the cab intermediate the toe board and formed in such manner as to accommodate the dirigible movement of the wheels while at the same time not interfering with the comfort of the operator or the facility with which he may operate the pedals and other control instruments in the vehicle, or without interference with his entrance into and exit from the vehicle.

In the preferred form of the present invention I have provided a wheel house portion for the front wheel which is in effect a continuation of the fender housing and is so projected into the side wall of the vehicle as to afford the operator easy entrance into the cab. The house portion is curved in such a manner as to form a pocket into which the wheel will move in its innermost steering position and at the same time provide appreciable clearance at the floor board adjacent the pedals so that the operator may be in a comfortable position during driving of the vehicle.

The wheel houses preferably are curved to overlie the curvature of the wheel itself with sufficient space therebetween to provide a jounce space. These house portions rise forwardly and upwardly from the floor board forward of the front seat and at the same time diverge laterally outwardly into the side walls of the cab so that at their highest point they occupy a very small portion of the floor space of the cab and thus do not interfere with the driver's feet. In effect these house portions fit beneath the knees of the operator when seated in the cab and do not in any manner interfere with the free movement of his legs required for operation of the vehicle. The outward divergence merges the house portions into the side walls of the cab at a point adjacent the junction of the toe board and floor board, thus taking no space at the pedal area.

Another feature of the present invention is the provision of a cab in which the door opens at the rear and swings about hinges on its forward edge, the door having its lower forward portion cut away so that it swings out over the wheel fenders and thus allows substantially unobstructed passage of the operator diagonally into and out of the cab.

Still another feature of the present invention resides in the provision of control means for direction signals and the like which may be mounted on the wheel housing within the cab adjacent the left side of the operator and within easy reach of his left hand whereby actuation of suitable direction signals is facilitated without requiring the switches or the like to be placed either on the steering post or the instrument board.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is a side elevational view of a truck embodying the present invention;

Figure 2 is a top plan view of a truck with the roof of the cab removed, as indicated generally by the line 2—2 of Figure 1;

Figure 3 is an enlarged partial sectional view taken substantially on the line 3—3 of Figure 2; and Figure 4 is an elevational view taken substantially on the line 4—4 of Figure 2.

Considering now the drawing in detail, the truck is provided with an engine compartment 5 having the grille 6 disposed forwardly of the radiator thereof and provided with the swinging hood 7 which swings vertically about its rear edge. Disposed rearwardly of the engine compartment 5 is the operator's cab indicated generally at 8 which cab as shown more in detail in Figure 2 has the lateral walls thereof converging inwardly toward the hood 7. These walls are indicated by the reference numeral 9 and together with the doors 10 form the lateral defining surfaces of the cab.

It will be noted that the forward portions of the walls 9 extend within the projected turning axes of the steering wheels 12 while the rear portion of the cab is of a lateral extent such as to extend a distance appreciably greater than the distance between the turning axes of the wheels.

The toe board of the bar is indicated at 13 and includes the portion 14 which is pressed rearwardly thereof substantially in the center of the vehicle and accommodating the rear portion of the engine and flywheel housing. The toe board itself rises vertically from a floor board 15, the junction between the toe board and floor board lying adjacent the transverse vertical plane through the turning axes of the wheels 12 and the toe board 13 intersecting such plane as it rises up to meet the bulkhead 16. On the left-hand side of the projection 14 suitable pedals 17 are provided for controlling the clutch and brake of the vehicle in the conventional manner and projecting rearwardly from the bulkhead 16 is the steering post 18 provided with a conventional steering wheel 19. Mounted on the rear wall 20 of the cab is the seat back 22 which with the seat cushion 23 forms the seat for the operator supported upon the seat support 24. Figs. 1 and 2 show a gear shift lever 17a rising from the transverse center of the floor board forwardly of the seat 23.

The wheels 12 are mounted for dirigible steering movement about a front wheel axle, not shown, which through the spring 25 shown in Figure 1 supports the chassis of the vehicle, including the side rails 26 to which these springs are secured. The floor board 15 of the cab is mounted directly on the chassis rails 26 and is thus disposed in a horizontal plane lying intermediate the top and center of the wheels 12. It will thus be seen that the floor board of the cab is disposed in a position such that if the wheels 12 are turned to their limiting steering positions they would project into the cab itself.

In order to accommodate such turning movement of the wheels I provide the wheel houses 27 which rise vertically from the floor board 15 at opposite lateral sides of the truck and which terminate at their rear ends substantially at the cut-away portion 28 of the door 10 whereby a passageway 29 is provided between the front of the seat cushion 23 and the rear of the house 27 which is ample to allow the operator to enter and leave the cab when the door 10 is swung open about its hinges 30. Inasmuch as the wheel houses 27 must accommodate the wheels 12 during jouncing thereof due to road irregularities, these houses must be spaced slightly greater than the jounce space required above the periphery of the wheels. This is indicated clearly in Figure 3. However, at their rear portions 32 the wheel houses 27 are of no appreciable vertical extent since they rise from the floor board to this point in an arcuate curve corresponding to the radii of the wheels and thus increase the vertical height thereof at their forward ends 33, the point of greatest height being indicated at 34. However, at the same time the lateral walls of the wheel house curve arcuately outwardly and at the same time diverge laterally in a forward direction substantially toward the turning axes of the wheels so that as the height of the house 27 increases its projection within the cab decreases which is further amplified by the inward convergence of the walls 9. As a result, at the highest point in the wheel house 27 the house actually occupies the least lateral amount of space within the cab 8.

It will therefore be apparent that the floor board 15 increases in width forwardly from the rear end 32 of the wheel houses and adjacent its junction with the toe board 13 is of a width substantially equal to the width of the cab whereby the wheel house portions 27 in no way interfere with the comfort of the operator and the ability to move his feet in the required manner to control the operation of the vehicle. At the same time, the floor board 15, rearwardly of the portion 32 of the wheel houses, increases laterally in such manner as to allow ample room at the portion 29 for entrance and exit from the cab. This increase in width of the flood board is more apparent in Figure 2 in which it will be seen that the floor board assumes a constricted shape adjacent the low rearward portion of the wheel houses 27 and increases in width as the wheel house increases in height. Thus the wheel house portions 27 actually fit beneath the knee of the operator adjacent the side wall and will in no way interfere with his freedom of movement within the cab.

It may be desirable to provide a direction signal upon vehicles of this type to facilitate control of such signals, inasmuch as the wheel house portion 27 lies adjacent the left knee of the driver and I have conceived of placing a direction control switch adjacent the upper portion of the left wheel house 27, this switch being indicated at 40 in Figure 3. The switch has a suitable control member 42 which is in substantially vertical position when inoperative and may be moved either to the left or right to actuate suitable circuts extending to the direction control 43 mounted on the fender 44 of the vehicle. The control 43 preferably has oppositely directed arrows therein which are selectively illuminated by the control member 42 operating within the switch 40. This places the control switch adjacent the left hand of the operator and facilitates rapid actuation thereof without requiring the operator to move his arm to any extended position away from the steering wheel 19.

It is therefore believed apparent that I have provided a novel cab arrangement for trucks of this type which materially increases the amount of pay load by increasing the available length of the truck body 50 within which the load is to be carried, and at the same time is not subject to objections raised to the cab-over-engine type of trucks.

I am aware that various changes may be made in certain types of construction of the present invention and I therefore do not intend to be limited except as defined by the scope and spirit of the appended claims.

I claim:

1. In combination, a truck chassis having dirigibly mounted front wheels, a cab on said truck having the floor thereof resting on said chassis and extending substantially below the top of said wheels and forwardly to a point substantially adjacent the turning axes of said wheels, side walls for said cab converging forwardly and passing within the transverse space between said axes, and wheel houses rising from the floor of said cab to accommodate steering movement of said wheels and having the inner walls thereof diverging outwardly toward said axes in such manner that they merge into the side walls of the cab adjacent the front transverse edge of the floor.

2. A vehicle comprising a frame having spaced longitudinally extending side rails and dirigibly mounted steering wheels, a cab having the floor thereof resting on said side rails and having a toe board intersecting said floor substantially in alinement with the turning axes of said wheels, said cab having forwardly converging side walls, and wheel housings in said cab terminating forwardly adjacent the junction of said floor and toe board, and converging inwardly of the cab in a rearward direction to accommodate inturning movement of the rear portions of said wheels.

3. A truck of the type defined by claim 1 further characterized by an engine compartment being positioned in advance of the cab and having side walls arranged to form continuations of the forwardly converging side walls of the cab to accommodate inward steering movements of the upper front proportions of the wheels.

4. A truck of the type defined by claim 1 further characterized by the floor being flat and continuous throughout the width of the cab except where the wheel houses rise therefrom, and a driver's seat, having a support resting on the floor, extending substantially the full width of the cab.

5. A truck of the type defined by claim 1 further characterized by an engine compartment being positioned in advance of the cab and having forwardly converging side walls, the floor being flat and continuous throughout the width of the cab except where the wheel houses rise therefrom, a driver's seat, having a support resting on the floor, extending substantially the full width of the cab, and a gear shift lever rising from the transverse center of the floor forwardly of the driver's seat.

SCHUYLER A. JEFFRIES.